United States Patent [19]

Sotonyi et al.

[11] Patent Number: 4,609,802
[45] Date of Patent: Sep. 2, 1986

[54] WIRE-LATTICE WELDING MACHINE

[75] Inventors: Thomas Sotonyi, Isernhagen; Heinz Webers, Meerbusch; Erich Elle, Korschenbroich, all of Fed. Rep. of Germany

[73] Assignee: Baustahlgewebe GmbH, Dusseldorf, Fed. Rep. of Germany

[21] Appl. No.: 676,566

[22] Filed: Nov. 30, 1984

[30] Foreign Application Priority Data

Dec. 3, 1983 [DE] Fed. Rep. of Germany ....... 3343763

[51] Int. Cl.4 .............................................. B23K 37/00
[52] U.S. Cl. ..................................... 219/56; 219/86.25
[58] Field of Search ..................... 219/56, 57, 58, 86.1, 219/86.33; 92/13.1

[56] References Cited

U.S. PATENT DOCUMENTS

| 2,503,382 | 4/1950 | Fisher | 219/86.1 X |
|---|---|---|---|
| 3,437,783 | 4/1969 | Lemelson | 219/58 X |
| 3,514,222 | 5/1970 | Korotkov | 92/13.1 X |
| 3,663,789 | 5/1972 | Camardella | 219/56 X |
| 3,692,970 | 9/1972 | Gött et al. | 219/56 |
| 4,510,370 | 4/1985 | Szantho et al. | 219/86.33 X |
| 4,529,858 | 7/1985 | Scherr et al. | 219/56 |

FOREIGN PATENT DOCUMENTS

| 2326921 | 2/1974 | Fed. Rep. of Germany . |
| 2915442 | 9/1980 | Fed. Rep. of Germany . |
| 3327243 | 11/1984 | Fed. Rep. of Germany . |
| 7950 | 9/1954 | German Democratic Rep. . |

Primary Examiner—Clarence L. Albritton
Assistant Examiner—C. M. Sigda
Attorney, Agent, or Firm—Howard M. Ellis; Michael L. Dunn

[57] ABSTRACT

A machine for making wire mesh, consisting of longitudinal and transverse wires, for concrete reinforcement purposes. For the adjustment of an electrode stroke for an optimum cycle time of the welding means, for different rod diameters, each lifting device (22) for the electrode (59) is provided with an adjustable stop (69) by which the stroke of the electrode (59) can be limited. The stop (69) is adapted to be moved forwards by a servomotor (68) to a position against the drive means (53) adjusting the electrode (59) and backwards by a predetermined distance determining the electrode stroke.

5 Claims, 5 Drawing Figures

WIRE-LATTICE WELDING MACHINE

The invention relates to a machine for making wire mesh consisting of longitudinal and transverse wires welded at their crossing points, particularly for the reinforcement of concrete, which machine comprises a plurality of welding units which are adapted to be moved to mutual spacing distances on a rail and each of which has a pair of electrodes consisting of a lower and an upper electrode, with a pressure-loaded lifting device for the upper electrode, the lifting device having an adjustable stop which serves to limit the movement of the electrode and is adapted to be brought against the drive means displacing the upper electrode.

Compared with a machine in which the lower and upper electrodes are not associated in pairs with individual welding units but are movable on respective rails independently of one another, a machine of the abovedescribed type has the advantage that for the adjustment of the spacing of the longitudinal wires no alignment of the lower and upper electrodes is needed.

In a machine having individually movable welding units with upper and lower electrodes, each welding unit has its own lifting device for the lifting movement of the upper electrode. It is true that this means that the cost of apparatus is increased in comparison with combined operation by means of a beam extending over all the welding units, but in this way the welding pressure can be individually controlled.

A disadvantage of a mesh welding machine comprising individual welding units consists in that the cycle time between individual welds is too long. Since a mesh welding machine must be designed for maximum wire thicknesses, the maximum electrode spacing must be slightly larger than the sum of the thicknesses of the thickest longitudinal and transverse wires. If, for example, longitudinal and transverse bars having a thickness of 12 mm each are to be welded, the electrode spacing must be greater than 24 mm. If on the other hand longitudinal and transverse rods of a diameter of 4 mm each are to be welded, the electrode spacing need only be slightly more than 8 mm. Comparison of these two examples shows that with the thin rods an idle stroke greater by 16 mm must be made for the application of the electrodes. This difference in stroke, which has to be tolerated particularly in the case of thinner types of rod, and the consequent reduction of the cycle time can reduce the production rate of a machine by up to 20%. Since in the welding of thin rods, as the result of the lower adjustment of welding power and welding time in comparison with the values adjusted for thicker rods, a considerably higher cycle time can be expected, the values of stroke times are in reciprocal relationship thereto.

Another problem in connection with the optimum stroke of the upper electrode, both in welding machines having welding beams for the upper electrodes and in welding machines comprising welding units, is that the electrodes wear during welding. The degree of wear of the individual electrodes differs from one welding unit to another and depends on the welding power applied. This means that in the course of time different lengths of idle strokes occur for the individual welding units. In accordance with electrode consumption, longer stroke times and consequently longer cycle times result.

Because of consumption, it is customary to replace the electrodes from time to time with new or at least reconditioned electrodes. Replacement and reconditioning are expensive in respect of labor.

The problem underlying the invention is that of providing a mesh welding machine of the type first defined above, with which it is possible to weld wire with an optimum cycle sequence.

According to the invention this problem is solved in that a servomotor for forward and backward adjustment is provided for each stop, and that for the triggering of each servomotor a control device is provided which individually adjusts the stops, which are adjustable by means of the servomotors, to the shortest distance between the upper electrode and the lower electrode, and then sets back all the stops to the same stroke distance.

In the machine according to the invention both the individual consumption of the electrodes of the various units and the thickness of the wires which are to be welded are taken into account in the adjustment of the position of rest, so that all the electrodes must travel the same stroke distance from their positions of rest to make contact with the wires at the crossing points. It is therefore possible to operate the mesh welding machine with an optimum cycle time. The adjustment of the stops is effected either with or without wires lying between the electrodes. If the wires are situated between the electrodes during the adjustment, the thickness of the wires is automatically taken into account in the return stroke to the starting position. This thickness can however also be taken into account even without the presence of wires if the control device is programmed in accordance with the thickness of the wires. However, in both cases the basis adopted is that the upper electrode rests either on the wires or on the lower electrode, so that the servo-controllable stop cannot be further advanced when the servomotor receives a signal for reversing, that is to say for backward adjustment of the stop. This reversing signal can for example be given by a proximity switch operated by the stop. The control device may also be programmed in such a manner that the stop is moved back so that in the case of larger wire diameters a longer idle stroke occurs than in the case of smaller wire diameters. In this way it can be ensured that thicker transverse rods can also be introduced without colliding.

Since with the machine according to the invention it is possible to adjust all the pairs of electrodes to the same spacing in a simple manner, it is also no longer necessary for electrodes which have suffered burn-off to be replaced with new or at least reconditioned electrodes. The electrodes can be reconditioned in a simple manner in the machine, while ensuring that unnecessary amounts of material are not removed from any electrode in the reconditioning process. According to a development of the invention the reconditioning can be effected without problem with the aid of a tool adapted to move on a rail parallel to the rail of the welding units, this tool being adapted to be inserted between the electrodes adjusted to the same spacing. Suitable tools are grinding and milling tools, particularly wheels.

In a further development of the invention the drive means for each upper electrode is a cylinder piston adapted to be loaded on both sides, the stop being a pushrod adapted to retract in the appertaining cylinder space in the direction of movement of the cylinder piston. Over part of its length the pushrod may be in the form of a spindle on which a nut adapted to be axially secured in the adjustment direction is mounted. The spindle is preferably coupled for rotation with the drive motor by means of a telescopic coupling.

The invention is explained more fully below with the aid of drawings which illustrate one example of embodiment, and in which.

Figure 1:
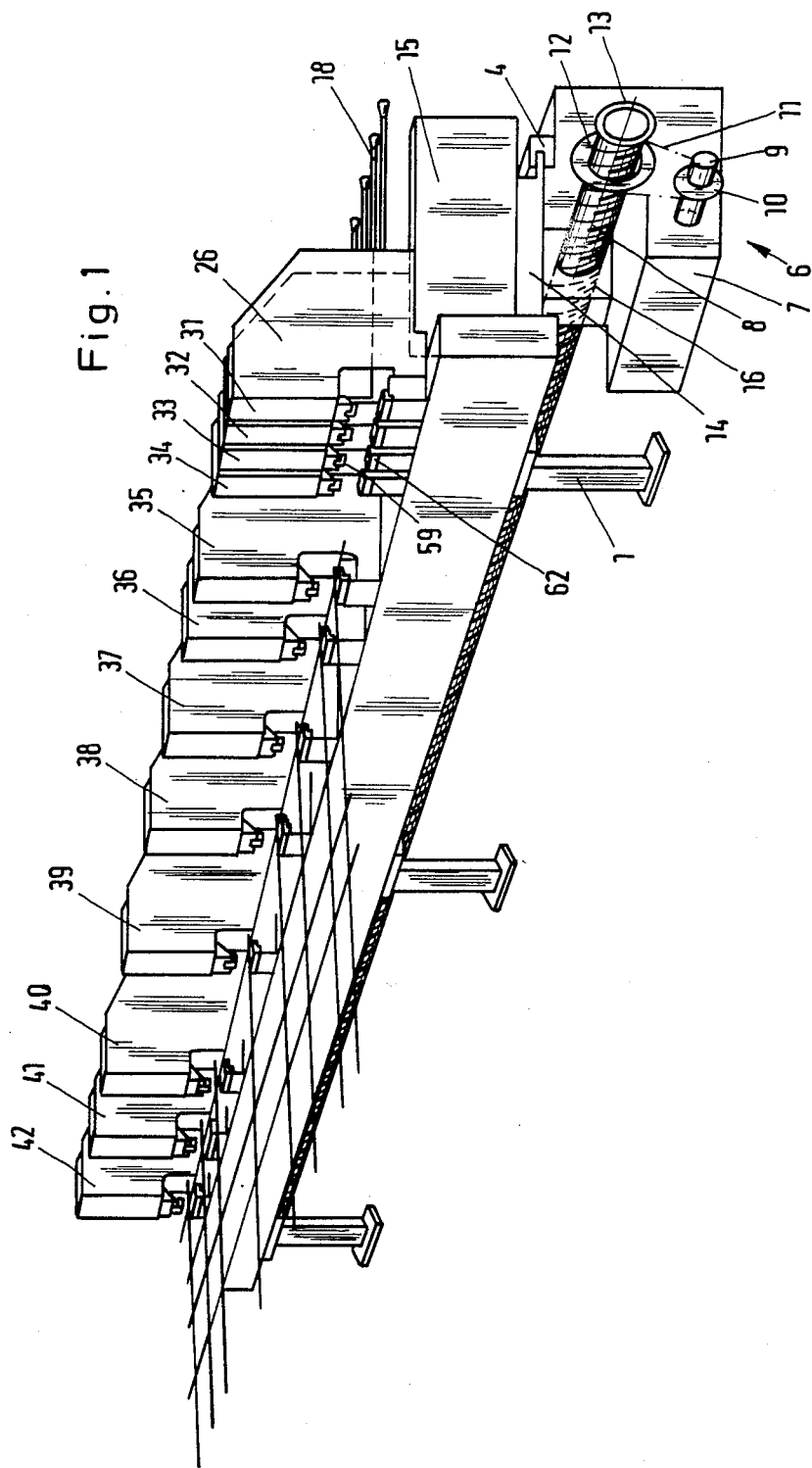
FIG. 1 shows in perspective a mesh welding machine comprising a plurality of juxtaposed welding units adapted to be moved to mutual spacing distances.

The welding machine comprises an underframe 1 having two rails which extend parallel and of which only the rear rail 4 can be seen in FIG. 1, and a drive 6. The drive 6 consists of a motor-transmission unit 7 and a drive spindle 8, which is driven by the transmission unit 7 by way of a chain drive consisting of a chain wheel 10 mounted on the output shaft 9 of the transmission unit 7, a chain 11 and a chain wheel 12 mounted on the drive spindle 8. The drive spindle 8 also carries a pulley 13 sensed by a sensor (not shown). The sensor, which is not shown, supplies to a control unit (not shown) pulses corresponding to the angle of rotation of the drive spindle.

The welding machine also comprises a number of identical welding units 31 to 42. Each of these welding units 31 to 42 is guided by a carriage 14 in the rails 4. On the carriage 14 the welding transformer 15, housed in a flat casing, is mounted. The actual welding unit 31, which is housed in a corresponding flat casing, is attached to the welding transformer 15. This unit consists essentially of an immovable lower electrode 62, which is connected to a current supply bar (not shown) on the secondary side, and of an upper electrode 59 which is adapted to be moved vertically by a lifting device 22 in the form of a cylinder adapted to be loaded on both sides, and which is connected to the secondary output of the transformer 15 by a flexible current bridge (not shown). The current supply leads and the mechanical lifting device are accommodated between two side plates 26 of the flat casing, in which plates a window 28 is provided for the electrodes 59, 62 and the transverse wire which is to be introduced transversely; the longitudinal rod feed 18 also leads into this window.

A number of identical welding units 31 to 42 are adapted to travel on the parallel rails 4 with the aid of a drive spindle 8, driven by a drive 7, and of suitable coupling means 16, to assume mutual spaced positions. The drive of the individual weld units is described in German Pat. No. 3 327 243.

Figure 2:
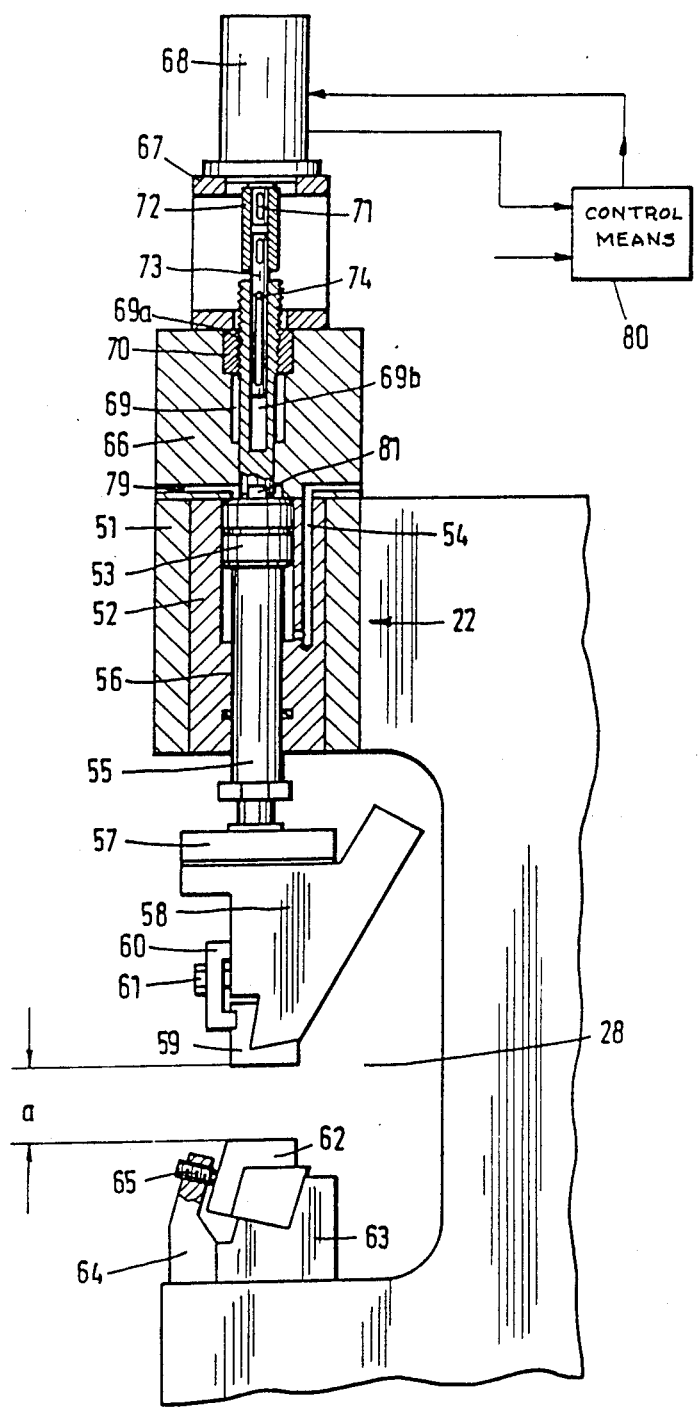
FIG. 2 shows in side view and partly in axial section a part of one of the welding units shown in FIG. 1, with the electrodes open.

The cylinder 52 of the lifting device 22 is inserted into a sturdy body 51. The plunger 53, which is adapted to be loaded on both sides, is shown in FIG. 2 in the highest position, the pressure medium supplied through a channel 54 loading the plunger 53 on its lower face. Beneath the body 51 the electrode head holder 57 is fixed on the plunger rod 55, which is guided in a sealed bush 56. The electrode head 58 is screwed fast to this holder 57. A consumable electrode 59 is clamped fast in the electrode head 58 by means of a clamp bracket 60 and a screw connection 61.

Beneath the electrode head 58 the stationary lower welding electrode 62 is clamped fast, with a spacing "a", in a secondary part 63 of the welding unit with the aid of a clamp bracket 64 and a clamp screw 65.

Above the lifting device 22 is fastened a guide 66 carrying an intermediate member 67 with a servomotor 68. In the guide 66, above the plunger 53, is installed a pressure limiting pushrod 69, which in in its upper region is in the form of a threaded spindle 69a on which is mounted a nut 70 inserted in the guide 66 in such a manner as to be non-rotatable and axially immovable therein. The pushrod 69 is provided with an axial bore 69b, in which is seated, in such a manner as to be axially displaceable but secured against rotation, a pin 73 provided with a fitting key 74. The pin 73 is fastened by a coupling sleeve 72 to the drive shaft 71 of the servomotor 68.

As the result of this connection between the servomotor 68 and the pushrod 69, the latter is displaced axially on the rotation of the motor 68.

A control device 80 determines the direction of rotation of the motor 68 and thus also the direction of the axial displacement of the pushrod 69. The control device 80 receives signals dependent on the angle of rotation from the motor 68. In this way the axial adjustment travel of the pushrod 69 can be monitored. In addition, the control device 80 receives a control signal from a proximity switch 81. This control signal is transmitted as soon as the pushrod 69 reaches the end face of the plunger 53.

Figure 5:
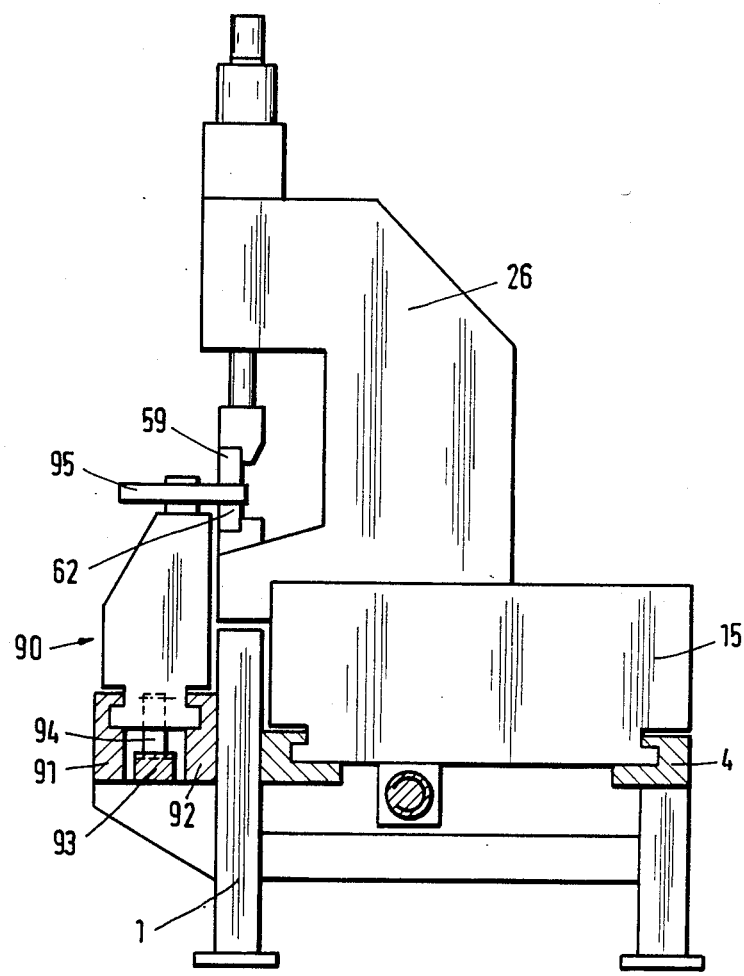
FIG. 5 shows in side view the mesh welding machine shown in FIG. 1, but equipped additionally with an electrode reconditioning tool movable on an attached rail.

In the example of embodiment shown in FIG. 5, the underframe 1 additionally carries a tool 90. Like the welding units 31, the tool 90 is adapted to travel on two parallel rails 91, 92, after the style of a carriage, along the various welding units 31 to 42. Like the welding units 31 to 42, the tool 90 can be moved in this way by means of a driven spindle. In the example of embodiment a rack 93 is provided, in which a driven pinion 94 meshes. The tool 90 is provided with a grinding wheel or milling wheel 95, which extends to a point between the electrodes 59, 62.

The operation of the machine during adjustment of the upper electrode is further explained below.

Figure 3:
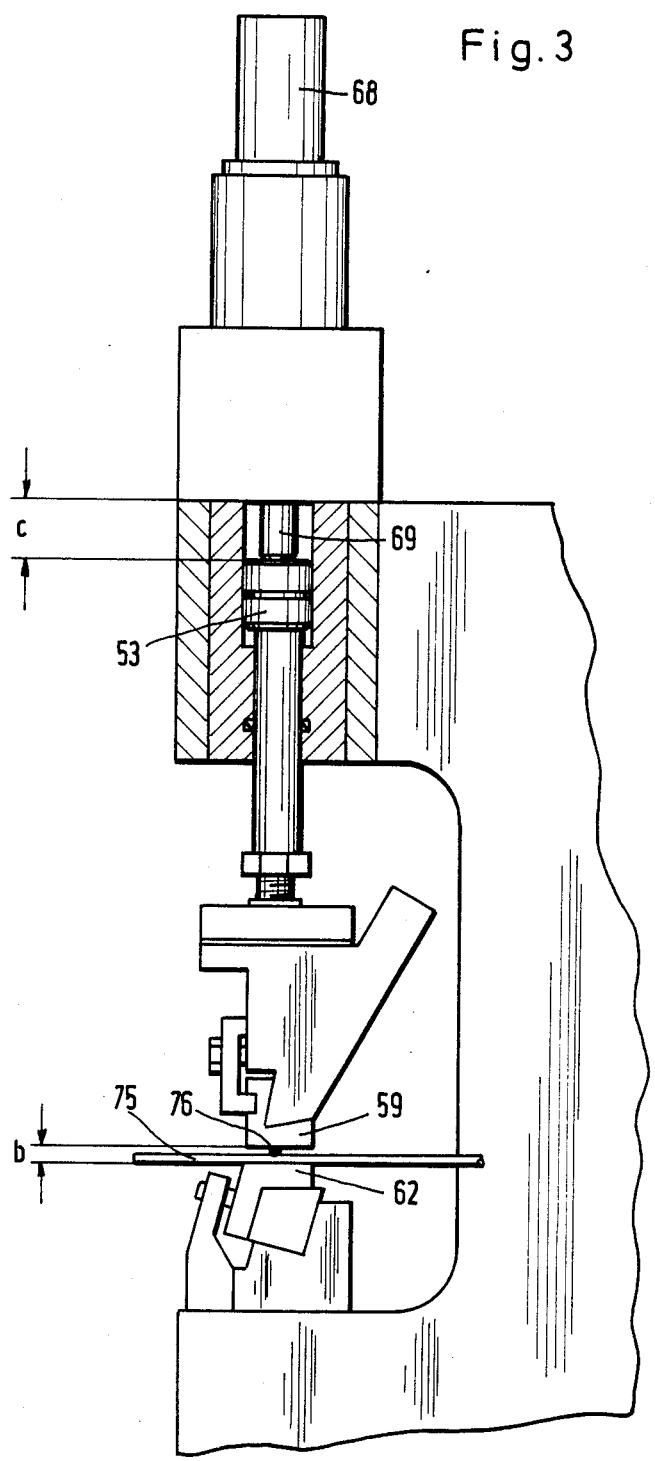
FIG. 3 shows in side view the welding unit shown in FIG. 2, with the electrodes closed.
Figure 4:
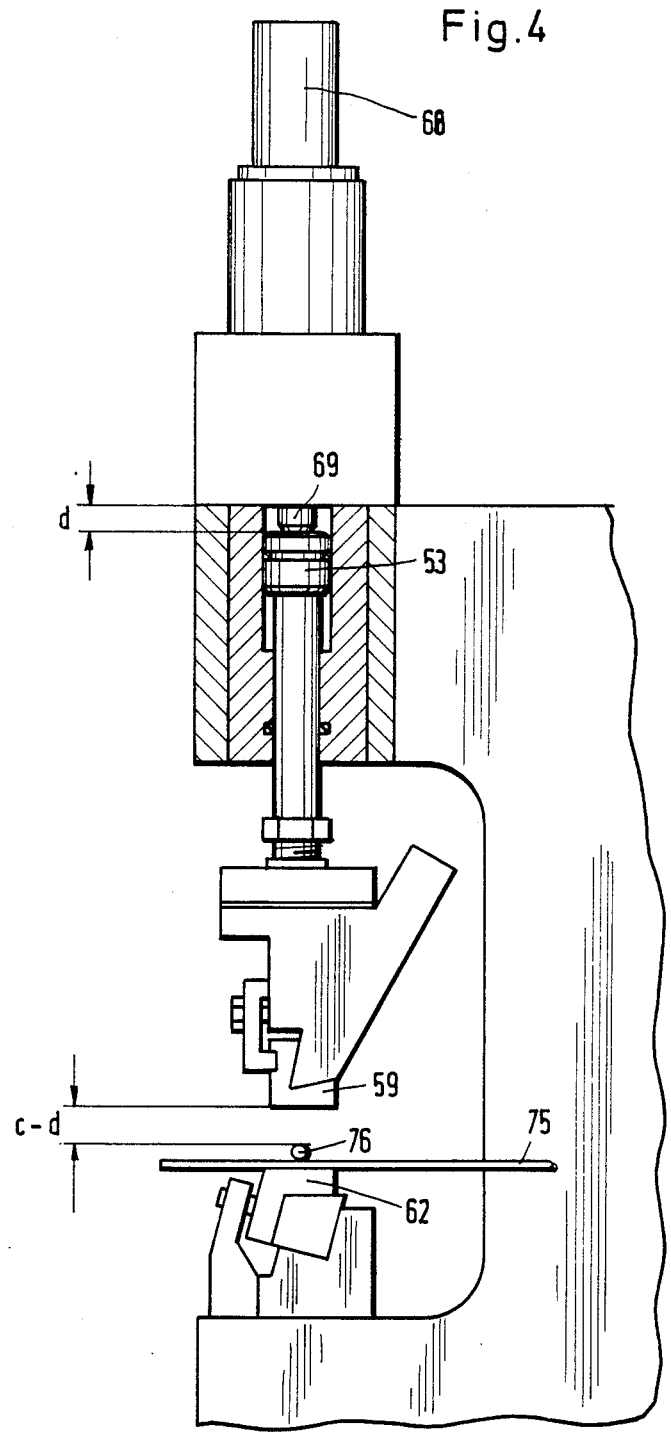
FIG. 4 shows in side view the welding unit shown in FIG. 2, with the electrodes open but with a shorter electrode spacing compared with FIG. 2.

In FIG. 2 the plunger 53, and thus also the electrode 59, are shown in the raised position. In order to be able to adjust the electrode 59 to the desired electrode stroke for determined rod diameters, the plunger 53 is loaded on its upper face with pressure medium supplied by way of a channel 79. The electrode 59 comes to rest on the intercrossing longitudinal and transverse rods 75, 76, as shown in FIG. 3. The electrode spacing b in this position is equal to the sum of the diameters of the transverse and longitudinal rods 75, 76. While the electrode 59 is held in this position, the pushrod 69 is moved downwards by means of the servomotor 68 until it comes to bear against the upper face of the plunger. The outward travel of the pushrod 69 then amounts to $a-b=c$. When this bottom position of the pushrod 69 is reached, the servomotor 68 is reversed and produces an upward movement to a determined distance, which is equal to the desired electrode stroke. This stroke equals $c-d$.

The signal for the reversing is supplied by the proximity switch 81. It is obvious that the proximity switch could also be replaced by a different sensor giving the corresponding reversing signal when subjected to pressure. In principle it would also be possible for the upper electrode to be moved downwards by means of the pushrod 69 until it comes to rest. A pressure sensitive sensor disposed between the pushrod and the plunger 53 could in this case give the signal for reversing.

Since all the pushrods are moved back the same distance, it is ensured that the idle stroke of all the electrodes will be the same.

In order to position the electrodes for the reconditioning, the control device must make the same adjustment. In this case the upper electrode is simply moved until it makes contact with the lower electrode, and the same return stroke is selected for all the electrodes, depending on the reconditioning tool. As soon as the electrodes have been moved to the same spacing, the tool is moved along the welding units. The grinding wheel 95 engaging between the upper and lower electrodes 59, 62 thus machines the surfaces of the electrodes of the individual welding units 31 to 42 one after the other.

We claim:

1. An apparatus for welding wire lattice, which comprises a plurality of adjacent welding units and means for mounting said units for lateral movement relative to one another, each of said welding units having an upper electrode, a lower electrode and drive means for longitudinal displacement of said upper electrode, said drive means including adjustable stop means for automatically limiting the displacement of the upper electrode to a retracted resting position according to the thickness of the wire lattice and degree of electrode wear for each welding unit, so that the upper electrode of each welding unit travels the same distance during the working stroke from said retracted resting position to the point of contact with the wire lattice, each of said welding units including motor means for axial displacement of the adjustable stop means, and control means for actuating the motor means and displacement of said stop means.

2. The apparatus of claim 1 including means for reconditioning the electrodes mounted for servicing each of said welding units.

3. The apparatus of claim 1 wherein the drive means is a cylinder piston.

4. The apparatus of claim 3 wherein the adjustable stop means is a pushrod.

5. The apparatus of claim 4 wherein the motor means is a servomotor coupled for rotation with a threaded connector for axial displacement of the pushrod on actuation of said servomotor.

* * * * *